(12) United States Patent
Nilakantan et al.

(10) Patent No.: US 8,892,863 B2
(45) Date of Patent: *Nov. 18, 2014

(54) SYSTEM AND METHOD FOR AUTOMATED NETWORK CONFIGURATION

(71) Applicant: Dell Products L.P., Round Rock, TX (US)

(72) Inventors: Chandrasekharan Nilakantan, Cupertino, TX (US); Lawrence Stein, San Carlos, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/108,076

(22) Filed: Dec. 16, 2013

(65) Prior Publication Data

US 2014/0108777 A1 Apr. 17, 2014

Related U.S. Application Data

(63) Continuation of application No. 13/096,061, filed on Apr. 28, 2011, now Pat. No. 8,612,738.

(51) Int. Cl.
*H04L 12/28* (2006.01)
*G06F 9/44* (2006.01)
*H04L 29/08* (2006.01)

(52) U.S. Cl.
CPC .............. *G06F 9/4416* (2013.01); *H04L 67/34* (2013.01)
USPC ............................................. 713/2; 370/389

(58) Field of Classification Search
USPC ......... 713/1, 2, 100, 300, 310, 320, 321, 322, 713/323, 324, 330, 340, 375
See application file for complete search history.

(56) References Cited

U.S. PATENT DOCUMENTS

| 7,724,670 | B2 | 5/2010 | Nilakantan et al. |
| 8,612,738 | B2 * | 12/2013 | Nilakantan et al. ............... 713/2 |
| 2007/0027973 | A1 | 2/2007 | Stein et al. |
| 2007/0174410 | A1 | 7/2007 | Croft et al. |
| 2007/0268917 | A1 | 11/2007 | Wong et al. |
| 2008/0091929 | A1 | 4/2008 | Oberhaus et al. |
| 2008/0219253 | A1 | 9/2008 | Pozhenko et al. |

* cited by examiner

*Primary Examiner* — Paul Yanchus, III
*Assistant Examiner* — Paul J Yen
(74) *Attorney, Agent, or Firm* — Haynes and Boone, LLP

(57) ABSTRACT

A method of configuring a data network with a controller, the data network including a plurality of hosts each associated with at least one of a plurality of switches, the method including receiving a request to boot an operating system image on one of the plurality of hosts, the operating system image having network connectivity requirements. Further, the method includes selecting a host out of the plurality of hosts on which to boot the operating system image. The method also includes booting the operating system image on the host, and configuring a switch out of the plurality of switches associated with the host based upon the network connectively requirements of the operating system image. Additionally, the method includes configuring networking attributes of a network interface in the host based upon the network connectivity requirements of the operating system image.

20 Claims, 7 Drawing Sheets

SYSTEM AND METHOD FOR AUTOMATED NETWORK CONFIGURATION

CROSS REFERENCE TO RELATED APPLICATIONS

The present application is a Continuation of U.S. Utility application Ser. No. 13/096,061 filed Apr. 28, 2011, and related to U.S. Utility application Ser. No. 13/096,460, filed on Apr. 28, 2011, the disclosures which are incorporated herein by reference.

BACKGROUND

The present disclosure relates generally to data networks, and more particularly to configuring network communications in a data network.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs are often networked together in large data centers. Data center management software has been developed to automate common data center tasks and to remotely manage hosts in the data center. As an aspect of this, the management software may often centrally store a variety of operating systems images that may be distributed to any number of the hosts in the network. Traditionally, after an operating system has been distributed and booted on a host, a data center administrator may be required to configure the networking resources of the host before it can communicate with other hosts in the network. Accordingly, it would be desirable to provide an improved system and method for automated network configuration in data networks.

SUMMARY

In one exemplary aspect, the present disclosure is directed to a method of configuring a data network with a controller, the data network including a plurality of hosts each associated with at least one of a plurality of switches, the method comprising: receiving, at the controller, a request to boot an operating system image on one of the plurality of hosts, the operating system image having network connectivity requirements, automatically selecting, with the controller, a host out of the plurality of hosts on which to boot the operating system image, the selecting being based upon the network connectivity requirements of the operating system image, booting, with the controller, the operating system image on the host, configuring, with the controller, a switch out of the plurality of switches associated with the host based upon the network connectivity requirements of the operating system image, and configuring, with an agent executing in the operating system image, networking attributes of a network interface in the host based upon the network connectivity requirements of the operating system image.

In another exemplary aspect, the present disclosure is directed to a method of configuring a data network with a controller, the data network including a plurality of hosts each associated with at least one of a plurality of switches and including a plurality of virtual networks associated with portions of the data network, the method comprising: receiving, at the controller, a request to boot an operating system image on one of the plurality of hosts, the operating system image requiring network connectivity to a first number of the virtual networks, automatically selecting, with the controller, a host out of the plurality of hosts on which to boot the operating system image, the selecting including selecting a host with network connectivity to each of the first number of virtual networks, determining, with the controller, whether a second number of network interfaces in the host is less than the first number of virtual networks, each of the second number of network interfaces being coupled to a switch port on one of the plurality of switches, booting, with the controller, the operating system image on the host, configuring, if the second number of network interfaces is not less than the first number of virtual networks, the layer 3 networking attributes of the second number of network interfaces with an agent on the host such that each of the second number of network interfaces is communicatively coupled to one of the first number of virtual networks, and instantiating on the host, if the second number of network interfaces is less than the first number of virtual networks, a third of number of virtual network interfaces equal to the first number of virtual networks with the agent on the host, the instantiating including configuring the layer 3 networking attributes of the third number of virtual network interfaces such that each of the third number of virtual network interfaces is communicatively coupled to a different one of the first number of virtual networks.

In yet another exemplary aspect, the present disclosure is directed to a data network management system for managing a data network that includes a plurality of hosts each associated with at least one of a plurality of switches and includes a plurality of virtual networks associated with portions of the data network, the system comprising: a controller operable to receive a request to boot an operating system image on one of the plurality of hosts, the operating system image requiring network connectivity to a first number of the virtual networks, automatically select a host out of the plurality of hosts on which to boot the operating system image, the selected host having network connectivity to each of the first number of virtual networks, determine whether a second number of network interfaces in the host is less than the first number of virtual networks, wherein each of the second number of network interfaces is coupled to a switch port on one of the plurality of switches, and boot the operating system image on the host, the operating system image including an operating system. The system also includes an agent module configured to execute in the operating system on the host, the agent operable to: configure, if the second number of network interfaces is not less than the first number of virtual networks, the layer 3 networking attributes of the second number of network interfaces such that each of the second number of network interfaces is communicatively coupled to one of the first number of virtual networks, and instantiate, if the second number of network interfaces is less than the first number of virtual networks, a third of number of virtual network interfaces equal to the first number of virtual networks, and configure the layer 3 networking attributes of the third number of virtual network interfaces such that each of the third number of virtual network interfaces is communicatively coupled to a different one of the first number of virtual networks.

DETAILED DESCRIPTION

Figure 1:
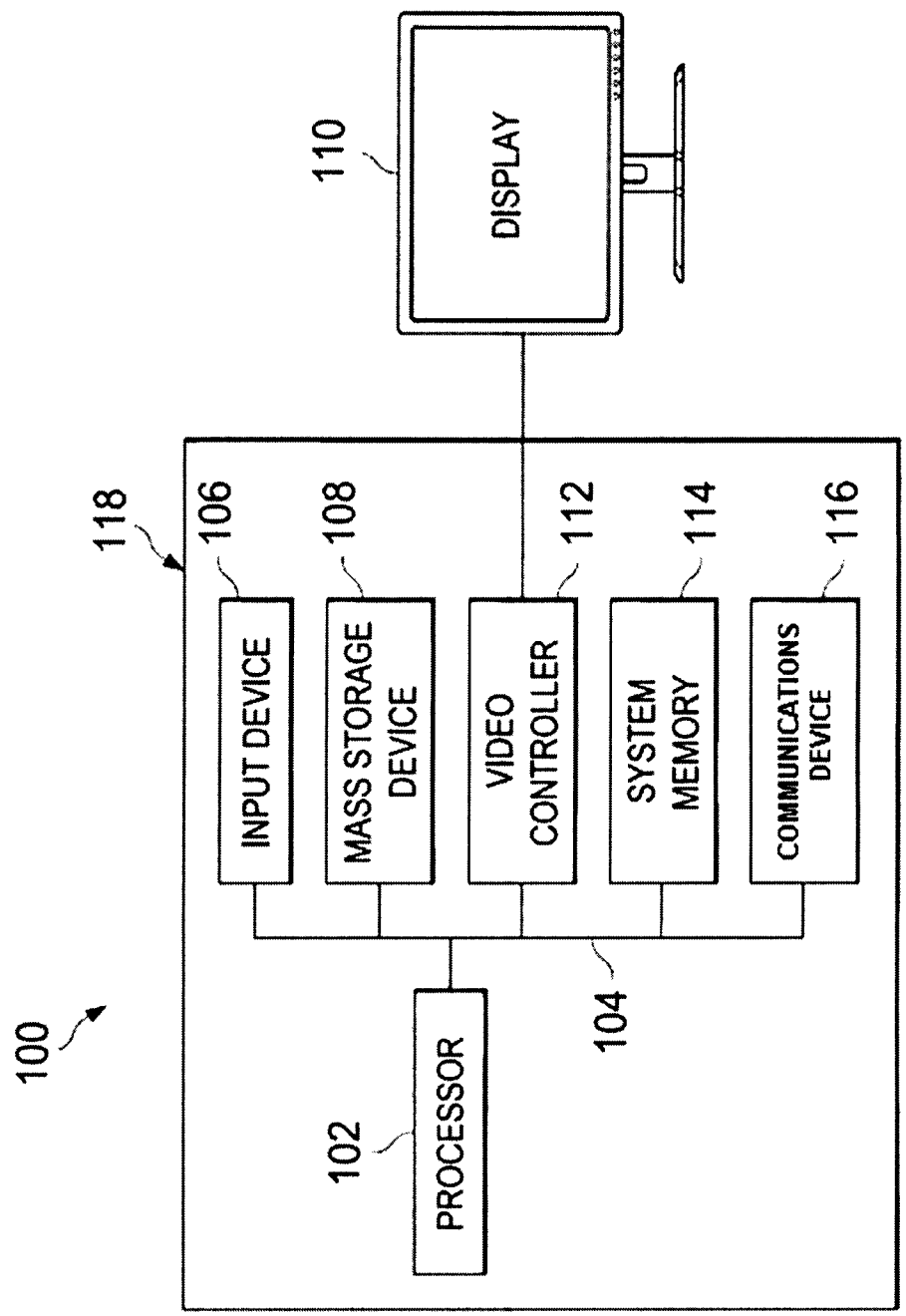
FIG. 1 is a functional block diagram of an exemplary embodiment of an information handling system (IHS).

FIG. 1 is a functional block diagram of an exemplary embodiment of an information handling system (IHS) 100. The IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the IHS 100 may be a personal computer, workstation, server, blade in a blade server, a PDA, a consumer electronic device, such as a smartphone, or any other suitable device and may vary in size, shape, performance, functionality, and price.

In one embodiment, the IHS 100, includes a processor 102, which is coupled to a bus 104. Bus 104 serves as a connection between processor 102 and other components of IHS 100. An input device 106 is coupled to processor 102 to provide input to processor 102. Examples of input devices may include keyboards, touchscreens, pointing devices such as mice, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, the IHS 100 includes a non-transitory computer-readable medium (e.g., the storage 108, the memory 114, etc) that may include computer-readable instructions that, when executed, cause the processor 102 to perform a variety of functions, described in further detail below. A communications device 116, such as a network interface card (NIC), is coupled to processor 102 to allow the IHS 100 to communicate with other devices over a network. In an embodiment, a chassis 118 houses some or all of the components of IHS 100. It should be understood that other buses and intermediate circuits can be deployed between the components described above and processor 102 to facilitate interconnection between the components and the processor 102.

Figure 2:
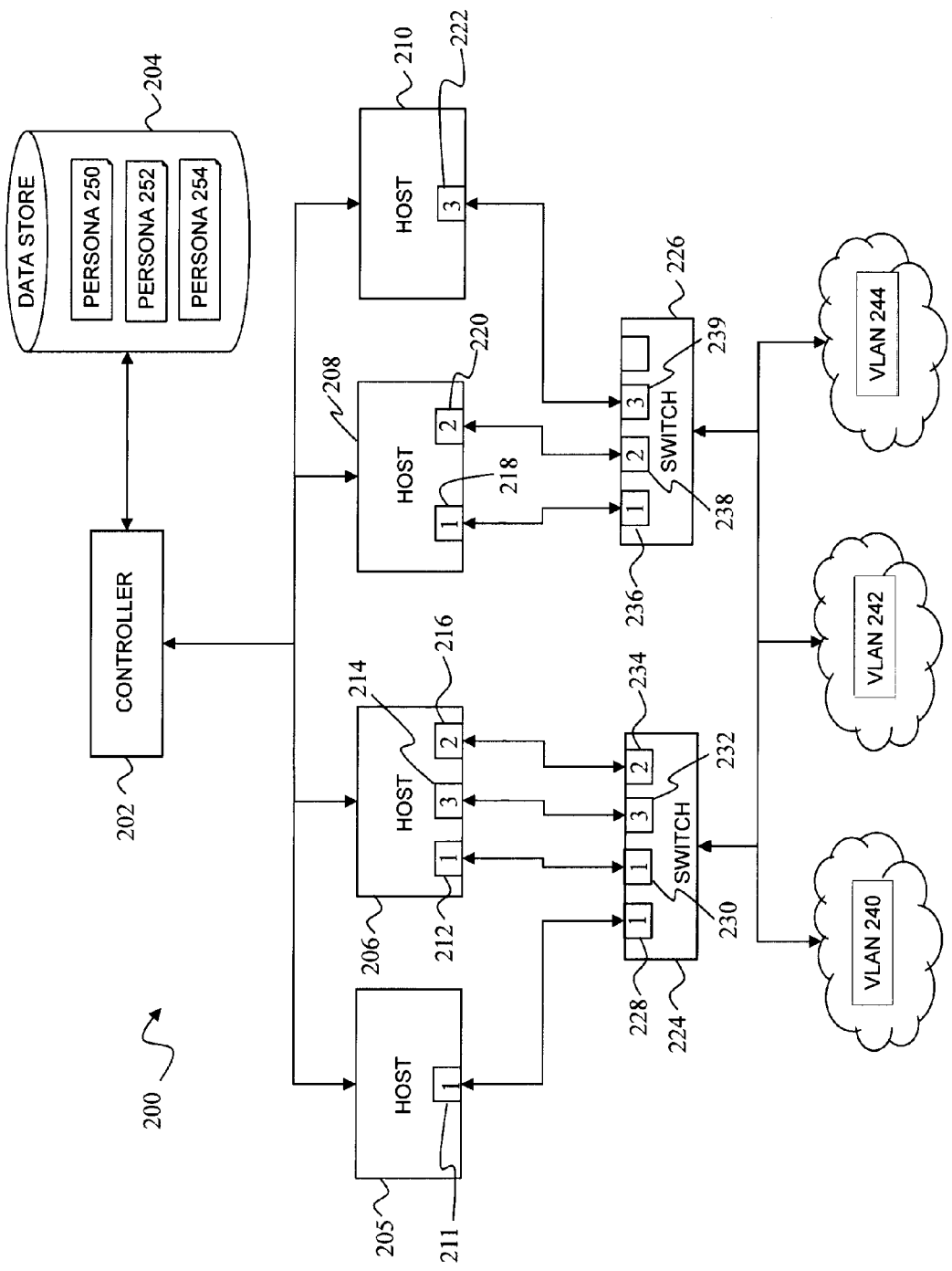
FIG. 2 is a functional block diagram of an exemplary embodiment of a managed system.

FIG. 2 is a functional block diagram of an exemplary embodiment of a managed system 200. The managed system 200 includes a controller 202 to centrally manage a multitude of heterogeneous servers, storage devices and networks in the system. In one embodiment, the controller 202 is an information handling system similar to IHS 100 with software configured to manage and monitor the managed system 200. In general, the controller 202 is operable to automatically distribute workloads and applications between hosts in the managed system 200 in response to user demand. More specifically, rather than a network administrator having to manually install an operating system (OS) image and applications on each host in the system, the controller 202 is configured to choose an appropriate host for a workload and automatically install or boot and configure an OS image and applications on the host. This is accomplished by logically separating the host software from the host hardware. In this regard, the controller 202 manages a plurality of software images, called personas, that include an OS image, applications installed in the OS, and configuration metadata such as network configuration attributes. In some instances, personas may be simply referred to as operating system images even though they may contain an OS image, applications, configuration metadata, etc. These personas (or operating system images) may be booted on any suitable host in the system 200. The managed system 200 includes a data store 204 to store and replicate these personas. In the illustrated embodiment, the data store 202 is a central storage repository such as a Fibre Channel storage area network (SAN), iSCSI target, or network-attached storage (NAS). However, in other embodiments, the data store 204 may be integrated into the controller 202. Additionally, the controller 202 stores and continually updates an inventory of all managed hosts in the managed system 200. When the controller 202 receives a request to boot a specific persona, the controller is operable to automatically select a host on which to boot the persona. The controller 202 selects a host in part on the network connectivity requirements of the persona. In some embodiments, a user may impose additional selection criteria to which the selected host must conform. The selection of a host by the controller 202 will be discussed in greater detail below. Further, after a host has been selected for a persona, the controller 202 is operable to boot the persona on the host and automatically configure the host according to the requirements of the persona. As one aspect of this, the controller 202 is operable to configure the physical NICs on the host to fulfill the persona's network connectivity requirements. The configuration of physical NICs by the controller will be discussed in greater detail in association with FIGS. 4-7.

The managed system 200 further includes hosts 205, 206, 208, and 210, that, in the current embodiment, are information handling systems similar to IHS 100 and may be servers, workstations, blade servers, or another type of IHS. In one embodiment, the hosts 205, 206, 208, 210 are communicatively coupled to the controller 202 via a dedicated system control network through which the controller may issue commands, monitor, and deploy personas to the hosts. As one aspect of this, the hosts may each include a management controller such as a baseboard management controller (BMC), an integrated Dell remote access controller (iDRAC), or other out-of-band (OOB) controller. Further, each host 205, 206, 208, 210 includes one or more physical network interfaces to communicate with other devices in the managed system 200. For instance, in the illustrated embodiment, the host 205 includes a 1 GB Ethernet network interface card (NIC) 211, host 206 includes three 1 GB Ethernet NICs 212, 214, and 216, the host 208 includes two 1 GB Ethernet NICs 218 and 220, and host 210 includes a 10 GB partitionable Ethernet NIC 222. These NICs may be LAN-on-Motherboard (LOM) NICs, PCI-based NICs, mezzanine NICs, or another suitable type of NIC. In other embodiments, the hosts 205, 206, 208, 210 may additionally or alternatively include partitionable converged network adapters (CNAs) or partitionable Infiniband NICs.

The managed system 200 also includes a layer 2 interconnect fabric including Ethernet switches 224 and 226 that are communicatively coupled to the hosts 205, 206, 208, and 210. The switch 224 includes ports 228, 230, 232, and 234 that are respectively coupled to NIC 211 on host 205 and NICs 212, 214, 216 on host 206. Switch 226 includes ports 236, 238, and 239 that are respectively coupled to NICs 218 and 220 on host 208 and NIC 222 on host 210. As shown in FIG. 2, the switches 224 and 226 communicatively couple the hosts 205, 206, 208, and 210 to a plurality of virtual local area networks (VLANs) including VLAN 240, VLAN 242, and VLAN 244. For the sake of clarity, the network connections between the hosts 205, 206, 208, and 210, layer 2 interconnect fabric switches 212 and 214, and VLANs 240, 242, and 244 shown in FIG. 2 have been simplified. For example, the managed system 200 may include any number of additional networking devices including hubs, switches, routers, load balancers, firewalls, servers, virtual networks, subnets, SANs, and other networking devices known in the art.

In the managed system 200, to provide for automated network configuration, access to VLANs is abstracted into channels. In the illustrated embodiment, channels define the allowed connectivity of a network interface to specific VLANs. Or, in other words, a channel defines a network path through which only packets associated with specific VLANs may flow. Typically, a channel is associated with more than one VLAN. For example, in the managed system 200, each switch port 228, 230, 232, 234, 236, 238, and 239 is assigned a channel number. Accordingly, each switch port may only route packets to the VLANs associated with its assigned channel. Further, the NICs in hosts 205, 206, 208, and 210 inherit the channel of the switch port to which they are connected. For instance, because switch port 228 is assigned channel 1, as shown in FIG. 2, NIC 211 is also assigned channel 1. Additionally, VLAN connectivity overlaps between channels—that is, a particular VLAN may be accessed thorough more than one channel. As such, access to a particular VLAN may be gained through a primary channel or a secondary channel, the latter of which provides a failover path.

As shown in FIG. 2, the switch ports of switches 224 and 236 are assigned channels as follows: port 228 is assigned channel 1, port 230 is assigned channel 1, port 232 is assigned channel 3, port 234 is assigned channel 2, port 236 is assigned channel 1, port 238 is assigned channel 2, and port 239 is assigned channel 3. As noted above, the NICs coupled to these ports inherit the channel of the port. The VLAN connectivity permitted by these channels is as follows:

| Channel | VLAN |
|---------|------|
| 1 | 240, 242 |
| 2 | 242, 244 |
| 3 | 244, 240 |

Thus, as an example, a network interface assigned channel 1, such as NIC 212 in host 206, may transmit and receive packets only from VLANs 240 and 242. Note that the above channel to VLAN associations are simply examples and, in other embodiments, the managed network 200 may include additional and/or different channels and additional and/or different VLANs, and the associated mappings may be somewhat more complex.

Still referring to FIG. 2, the data store 204 includes personas 250, 252, and 254 that the controller 202 may boot on any suitable host in the managed system 200. As mentioned above, the personas contain configuration metadata including a number of attributes that describe its network connectivity, storage, and application-specific configuration. For example, an application in a persona may require network connections to specific networks (i.e. VLANs) for testing purposes. Whether a host in the managed network 200 is suitable for a persona is dependent in part on whether it can fulfill the persona's network connectivity requirements. In this regard, the aforementioned channel concept is utilized by the controller 202 to match persona network connectivity requirements with host network connectivity capabilities. For instance, if the persona 250 requires a connection to VLAN 244, it must be booted on a host with a NIC assigned channel 2 or 3, since channel 1 does not provide a path to VLAN 244. Thus, host 205, which only has a single NIC that assigned to channel 1, may not be selected by controller 202 as a boot host for persona 250. However, the persona 250 may be booted on any one of hosts 206, 208, and 210 because they provide access to VLAN 244. As another example, in the illustrated embodiment, the persona 252 requires network connectivity to VLANs 240, 242, and 244. The controller 202 may thus choose to boot persona 252 on a host with NICs assigned to any two of the three channels, as that would insure connectivity to all three VLANs. In this regard, a host need not have a NIC corresponding to each required VLANs as a virtual NIC (vNIC) may be instantiated on the host to provide additional network connections. A vNIC, in this context, is a software-based, tagged network interface executing in the persona operating system that appears to applications as a physical network interface. The host must simply have sufficient access to the required VLANs, as defined by the channels assigned to its NICs. Thus, given the network connectivity requirements of persona 252, the controller 202 may choose to boot the persona 252 on host 206 or 208. However, for performance reasons, it may be preferable to boot a persona on a host with a number of NICs greater than or equal to the number of required VLANs. As such, with all other factors being equal, the controller 202 may select host 206 over host 208 as it has three physical NICs and persona 252 requires access to three VLANs. The process of instantiating vNICs on hosts in managed system 200 will be discussed in greater detail in association with FIG. 5.

As a further example, in the illustrated embodiment, the persona 254 requires network connectivity to VLANs 240 and 244. The controller 202 may select hosts 206, 208, or 210, but not host 205 because its only NIC, NIC 211, is assigned channel 1, which does not provide a path to VLAN 244. The controller 202 may preferably select either host 206 or host 208 for persona 252 as they have a sufficient number of physical NICs, however, if both of those hosts are already running a persona or are out of service, the controller may select host 210. In such a case, vNICs may be instantiated on the host 210, or in some embodiments, the 10 GB NIC 222 may be partitioned into two virtual interfaces, where each sends and receives packets from a particular VLAN. In cases where the total throughput speed of a partitionable NIC is greater than the combined throughput speed of standard NICs, it may be advantageous to boot a persona on the host with the partitionable NIC rather than create vNICs. Further, hosts with a partitionable NIC may also preferable over hosts with vNICs because certain applications may not be compatible with vNICs. The process of partitioning a NIC will be discussed in greater detail in association with FIG. 6.

Figure 3:
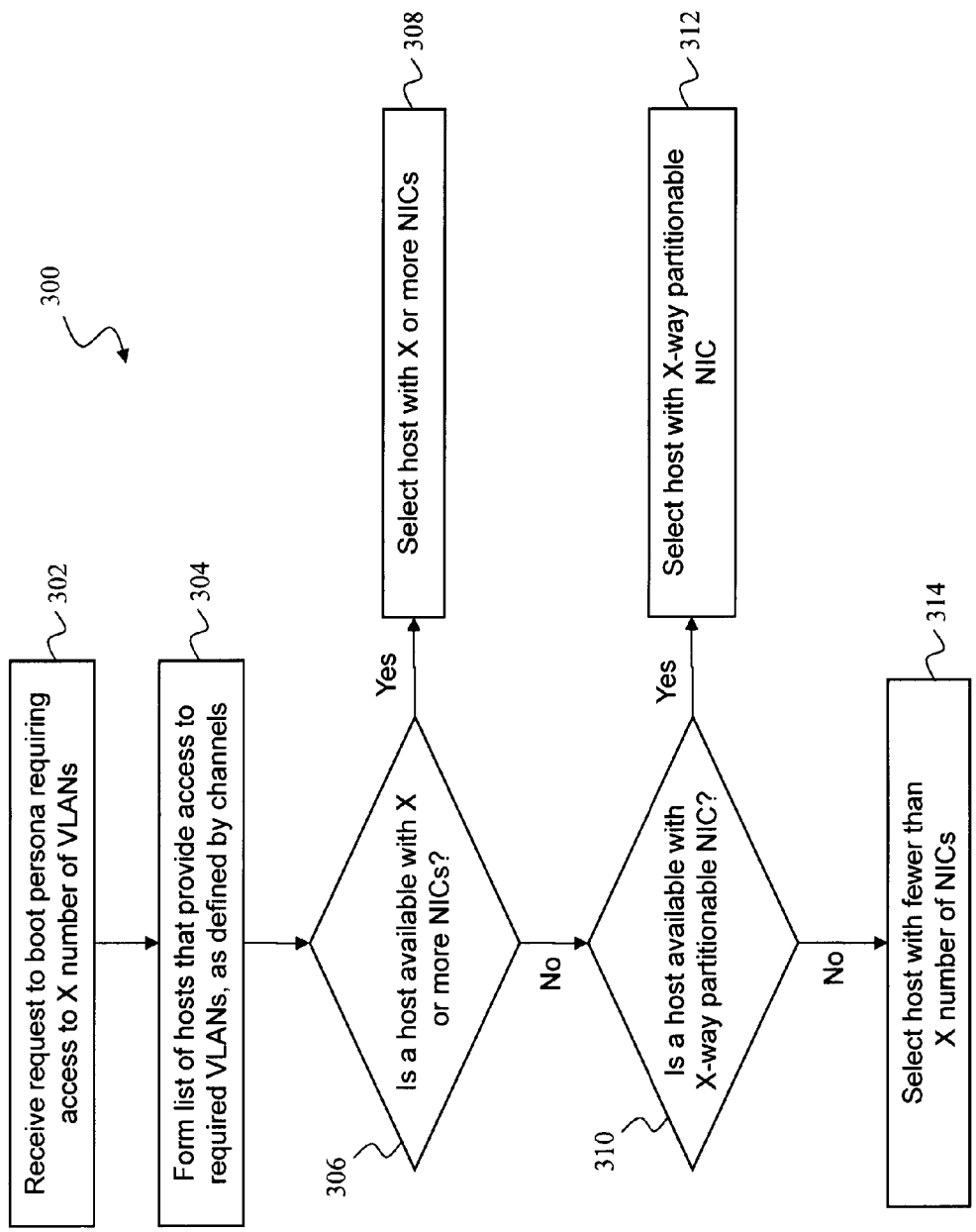
FIG. 3 is a high-level flowchart illustrating one embodiment of an method that may be used by a controller in the managed system of FIG. 2 to select a host in the system on which to boot an operating system image.

As described by the examples above, the controller 202 includes an algorithm for selecting a host in the managed system 200 on which to boot a particular persona. In this regard, FIG. 3 is a high-level flowchart illustrating one embodiment of a method 300 that may be used by controller 202 to select a host on which to boot a particular persona. The method 300 begins at block 302 where the controller receives a request to boot a persona that requires network connectivity to X number of VLANs. The method 300 proceeds to block 304 where, from an inventory of all hosts in the managed system 200, the controller 202 forms a list of hosts that provide network connectivity to the required VLANs. Specifically, the list includes only hosts with NICs assigned to channels through which the required VLANs may be accessed. The method 300 then moves to decision block 306 where the controller 202 determines if there is a host available that may satisfy the persona's network connectivity requirements with physical NICs. That is, the controller looks for a host with at least X number of physical NICs. If there is such a host available, the method proceeds to block 308 where the controller 202 selects a host with X or more physical NICs on which to boot the persona. If there are no hosts available with X or more NICs, the method 300 moves to decision block 310 where controller 202 determines if there is a host available with a partitionable NIC that may be partitioned into at least X number of virtual interfaces. If there is such a host available, the method proceeds to block 312 where the controller 202 selects a host with an X-way partitionable NIC on which to boot the persona. If there are no hosts available with an X-way partitionable NIC, the method proceeds to block 314 where the controller selects a host with fewer than X number of physical NICs on which to boot the persona. In such as scenario, as discussed later, vNICs may need to be instantiated in the persona upon bootup.

Note that the above method focused on selecting a host based only on network connectivity. In some embodiments, a user of the managed system 200 may impose additional selection criteria such as processor speed, machine type, etc. In those embodiments, the controller may still utilize the method 300, however, the number of hosts available for selection may be limited. Further, the selection order of method 300 is based upon the premise that partitioning a NIC is preferable over instantiating vNICs in a persona, for example, for the reasons previously discussed. But, in other embodiments, it may be preferable to utilize vNICs rather than partition a NIC.

Figure 4:
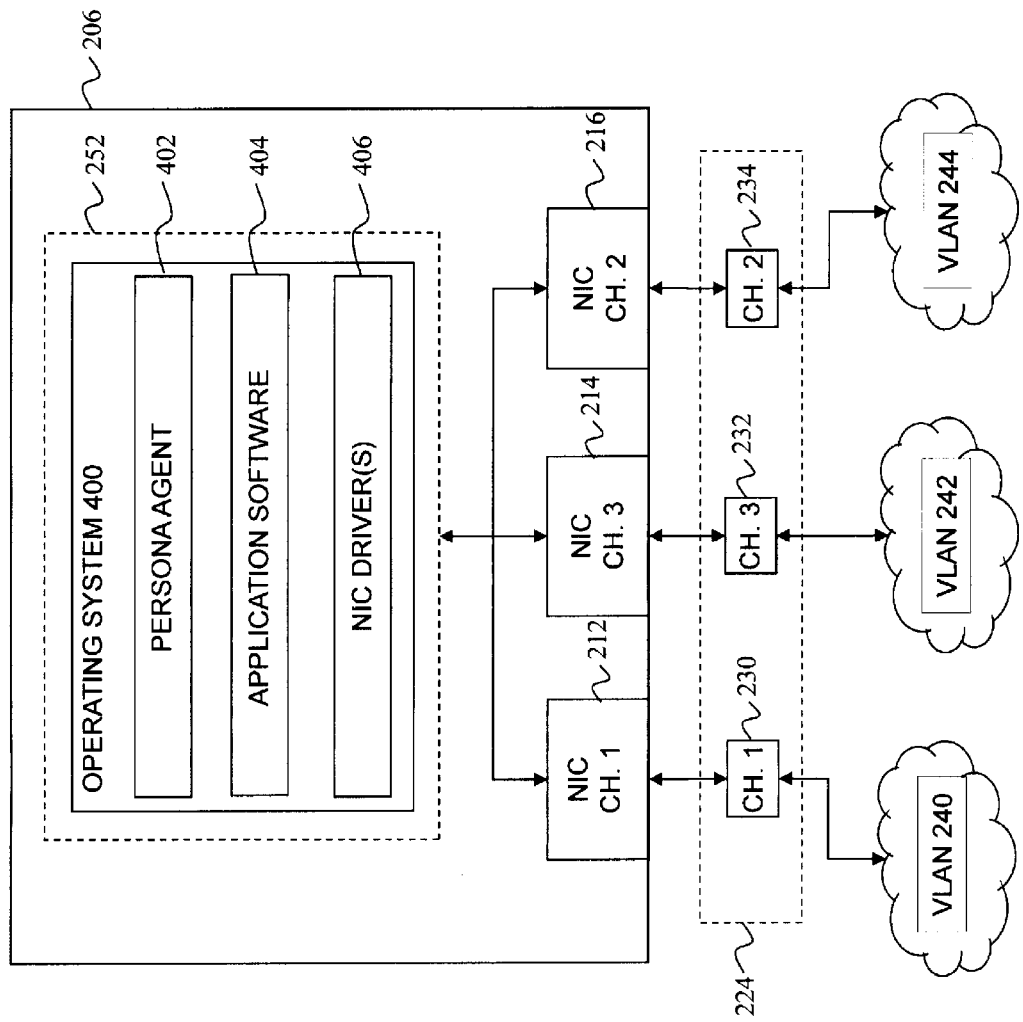
FIG. 4 is a functional block diagram of a portion of the managed system of FIG. 2.

With reference now to FIG. 4, illustrated is a functional block diagram of a portion of the managed system 200 that includes host 206. Specifically, FIG. 4 depicts a scenario in which persona 252 has been booted on host 206. As discussed above, persona 252 requires network connectivity to VLANs 240, 242, and 244. Using the algorithm illustrated in FIG. 3, controller 202 selected host 206 for persona 252 because its NICs 212, 214, and 216 are respectively assigned channels 1, 3, and 2, which together provide access to the required VLANs 240, 242, and 244. Further, in some embodiments, controller 202 may have selected host 206 because it may provide better network performance than other hosts in managed system 200 that do not have enough physical NICs to create independent connections with each required VLAN. As noted above, once host 206 has been selected for the persona 252, the controller 202 is operable to not only boot the persona on the host but also operable to automatically configure the host's physical NICs to fulfill the persona's network connectivity requirements.

As shown in FIG. 4, when booted on host 206 the persona 252 includes at least an operating system 400, a persona agent 402, application software 404, and NIC drivers 406. The persona agent 402 is a client program that communicates with controller 202 to receive instructions and configure aspects of host 206. Specifically, the controller 202 utilizes the agent 402 to, among other things, configure the network connections of the host 206. When the persona 252 is booted on the host 206 for the first time, the agent 402 is among the first programs to load in the operating system 400, as the agent is responsible for setting up the networking connections for other applications, such as application software 404. In the illustrated embodiment, the application software 404 is a web server that, for testing purposes, requires access to VLANs 240, 242, and 244 (i.e. the reason persona 252 requires access to VLANs 240, 242, and 244). Additionally, in one embodiment, the NIC drivers 406 expose an application programming interface (API) set through which the agent 402 may configure the NICs 212, 214, and 216.

In order to configure the network connections of host 206, the controller 202 must perform a number of steps. First, the controller 202 must determine if the number of physical NICs on the host 206 matches or exceeds the number of VLANs the persona 252 requires access to. If so, as here, the controller 202 will first place each of the switch ports coupled to the NICs in access mode—that is, each of the switch ports will receive and transmit packets to only one VLAN. Then, the controller 202 will examine the channel assignments of the switch ports 230, 232, and 234 and the VLAN requirements of the persona and determine which switch port should be associated with which VLAN. Here, the controller 202, through the use of non-illustrated switch management infrastructure, assigns VLAN 240 to switch port 230, assigns VLAN 242 to switch port 232, and assigns VLAN 244 to switch port 234. Next, on the host 206, the controller 202 will send commands to the agent 402 to configure the NICs 212, 214, and 216. Using the channel assignments of the switch ports on the switch 224, the controller 202 determines the NIC to VLAN mappings and sends this information to the agent 402 so it may configure the NICs on host 206. Here, NIC 212 is mapped to VLAN 240, NIC 214 is mapped to VLAN 242, and NIC 234 is mapped to VLAN 244. Thus, after the persona 252 has booted on the host 206, the agent 402 will receive the NIC-VLAN mappings from the controller 202 and instructions to configure the layer 3 networking attributes of the NICs 212, 214, and 216. Using this configuration information from the controller 202, the agent 402 will configure the following attributes in the NICs 212, 214, and 216: IP address, DHCP hostname, and NIC Specific Routes including multicasting. If the operating system 400 is a Windows-based operating system, the agent may configure additional attributes, such as NetBIOS over TCP, Wins Server Address, DNS server registration. After the physical NICs 212, 214, and 216 have been mapped to a specific VLAN and have been assigned layer 3 attributes, applications in operating system 400, such as application software 404, may access the desired VLANs.

Figure 5:
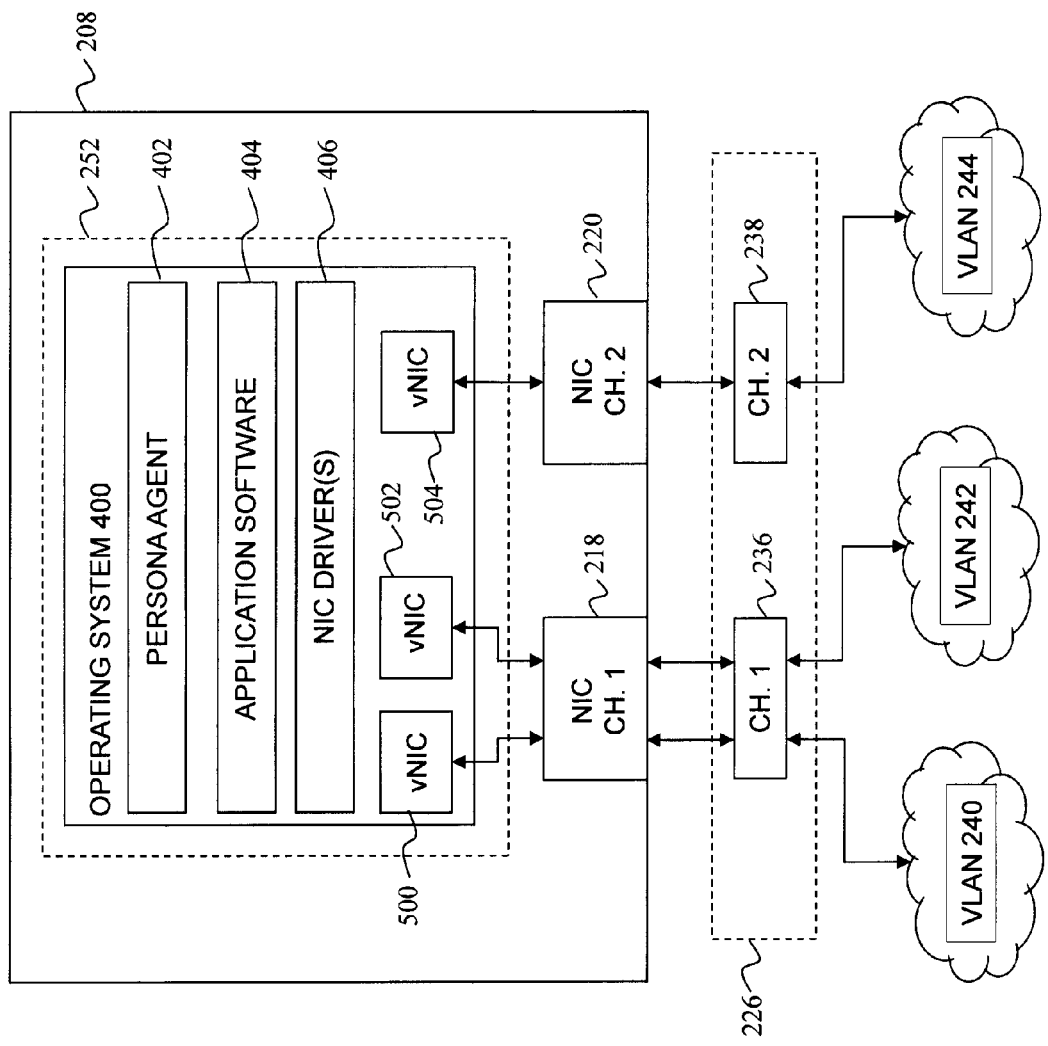
FIG. 5 is a functional block diagram of another portion of the managed system of FIG. 2.

With reference now to FIG. 5, illustrated is a functional block diagram of a portion of the managed system 200 that includes host 208. Specifically, FIG. 5 depicts a scenario in which persona 252 has been booted on host 208. As discussed above, persona 252 requires network connectivity to VLANs 240, 242, and 244. Using the algorithm illustrated in FIG. 3, controller 202 selected host 208 for persona 252 because its NICs 218 and 220 are respectively assigned channels 1 and 2, which together provide access to the required VLANs 240, 242, and 244. However, in one embodiment, because host 208 only has two physical NICs, host 208 may not have been the first choice of the controller 252 for persona 252. In such a scenario, other hosts in managed system 200 with three or more NICs, such as host 206, may have been unavailable.

As shown in FIG. 5, when booted on host 208 (or any other host, such as host 206 as shown in FIG. 4) the persona 252 includes the operating system 400, the persona agent 402, the application software 404, and NIC drivers 406. Accordingly, the network connectivity requirements of the persona 252 remain constant no matter which host its booted on. However, because the host 208 has a different number of NICs than host 206, the controller 202 must perform a different steps to configure the network connections for persona 252 on host 208. First, the controller 202 must determine if the number of physical NICs on the host 208 matches or exceeds the number of VLANs the persona 252 requires access to. If not, as here, more than one VLAN may be mapped to a single physical NIC. This, in turn, requires, one or more switch ports to transmit and receive packets from multiple VLANs. As such, after the host 208 has been selected for persona 252, the controller 202 places the switch ports 236 and 238 in trunk mode—that is, they transmit and receive packets from more than one VLAN. The controller 202 then examines the channel assignments of the switch ports 236 and 238 and the VLAN requirements of the persona and determines which switch port should be associated with which VLAN(s). Here, the controller 202, through the use of non-illustrated switch management infrastructure, assigns VLAN 240 and VLAN 242 to switch port 236 and assigns VLAN 244 to switch port 238. Next, because there is not a one-to-one mapping of physical NICs to VLANs, the controller 202 instructs the agent 402 to instantiate vNICs 500, 502, and 504 in the operating system 400. As mentioned above, vNICs are software-based, tagged network interfaces that cooperate with the NIC drivers 406. In the embodiments in which operating system 400 is a Linux-based operating system, the agent 402 may instantiate Linux's built-in vNIC capabilities. Through these vNICs, the application software 404 may communicate with specific VLANs in the same way it communicates through the physical NICs in host 206. But before the application software 404 does so, the agent 402 must bind the vNICs 500, 502, and 504 to physical NICs 218 and 220 based on the channel assignments of the physical NICs. Because the persona 252 requires access to VLANs 240 and 242 and channel 1 provides a path to both VLAN 240 and 242, the agent will bind vNIC 500 and 502 to NIC 218, which is assigned channel 1. Channel 2 provides a path to VLAN 244, so vNIC 504 is bound to NIC 220, which is assigned channel 2. After the vNICs 500, 502, and 504 have been bound to the appropriate NIC, the agent 402 configures the layer 3 networking attributes of the vNICs just as it configured the layer 3 attributes of the physical NICs in host 206. For example, the agent assigns IP address to the vNICs using information received from controller 202. Once the host 208 has been configured as described, the application software 402 may access VLAN 240 through vNIC 500, access VLAN 242 through vNIC 502, and access VLAN 244 through vNIC 504.

Figure 6:
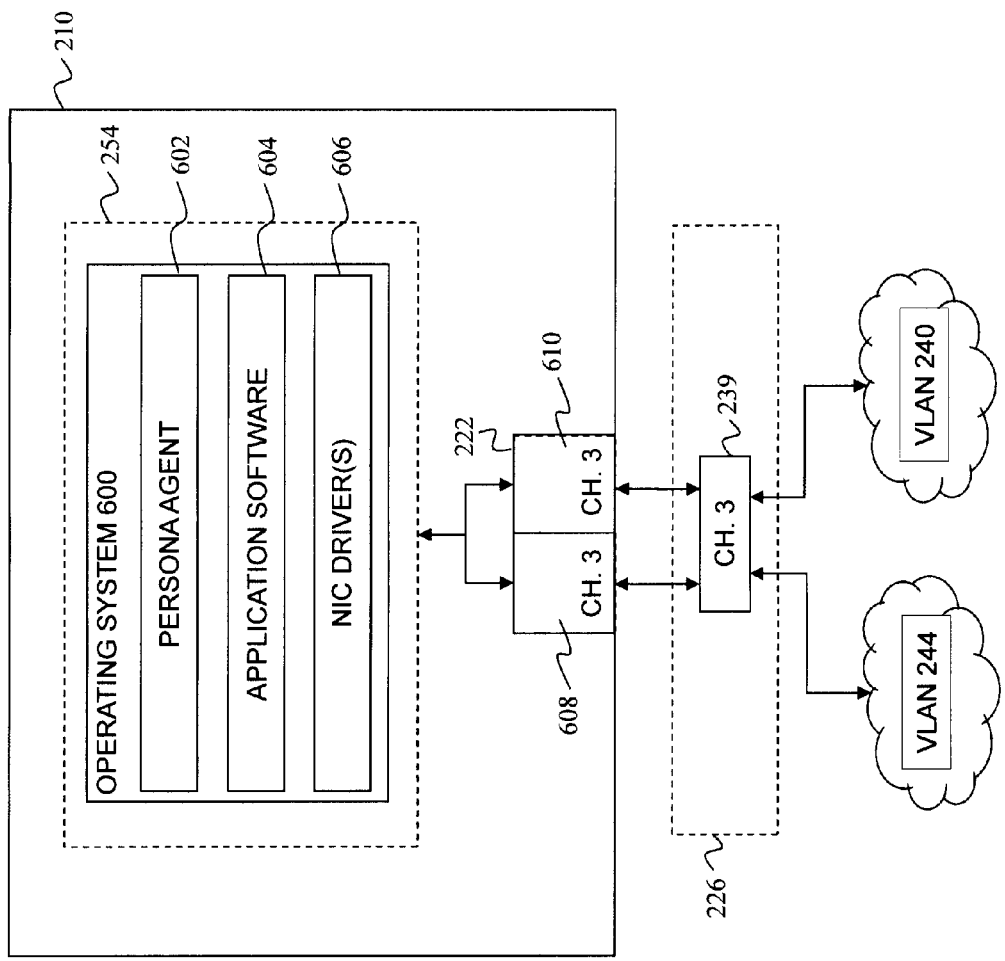
FIG. 6 is a functional block diagram of yet another portion of the managed system of FIG. 2.

With reference now to FIG. 6, illustrated is a functional block diagram of a portion of the managed system 200 that includes host 210. Specifically, FIG. 6 depicts a scenario in which persona 254 has been booted on host 210. As discussed above, persona 254 requires network connectivity to VLANs 240 and 244. Using the algorithm illustrated in FIG. 3, controller 202 selected host 210 for persona 254 because its NIC 222 is assigned channel 3, which provides a path to the required VLANs 240 and 244. Here, because persona 254 requires access to two VLANs, yet host 210 only includes one physical NIC, host 210 may not have been the first choice of the controller 202 for persona 254. As shown in FIG. 6, when booted on host 210 the persona 254 includes at least an operating system 600, a persona agent 602, application software 604, and NIC drivers 606. The persona agent 602 may be similar to the persona agent 402 described in association with FIG. 4. In the illustrated embodiment, the application software 604 is a network traffic analyzer that, for data collection purposes, requires access to VLANs 240 and 244 (i.e. the reason persona 254 requires access to VLANs 240 and 244).

In order to configure the network connections of host 210, the controller 202 must perform a number of steps. First, the controller 202 must determine if the number of physical NICs on the host 210 matches or exceeds the number of VLANs the persona 254 requires access to. If not, such as here, the controller 202 may instantiate vNICS in the operating system 600 or because the NIC 222 is partitionable, it may divide the NIC into multiple virtual interface partitions through which multiple VLANs may be accessed. In the illustrated embodiment of FIG. 6, the controller 202 determined that partitioning the NIC 222 would result in better network performance than instantiating vNICs in the operating system 600. Although in the current embodiment the NIC 222 is a 10 GB Ethernet NIC, it may alternatively be a partitionable converged network adapter (CNA) or partitionable Infiniband NIC. To configure the network connections of host 210, the controller must first place the switch port 239 on switch 226 in trunk mode as both VLAN 244 and VLAN 240 must be accessed through it. Next, the controller 202 may send instructions to the agent 602 to partition the NIC 222 into two interfaces partitions 608 and 610, where interface 608 is mapped to VLAN 244 and interface 610 is mapped to VLAN 240. In some embodiments, the total bandwidth of the NIC 222 may be dynamically divided between the interface partitions 608 and 610 based upon the anticipated network traffic on each of VLANs 244 and 240. Next, using information from the controller 202, the agent 602 configures the layer 3 networking attributes, such as IP address, for each of the interface partitions 608 and 610. In this manner, the application software 604 may access the VLAN 244 through the interface partition 608 and access the VLAN 240 through the interface partition 610.

Figure 7:
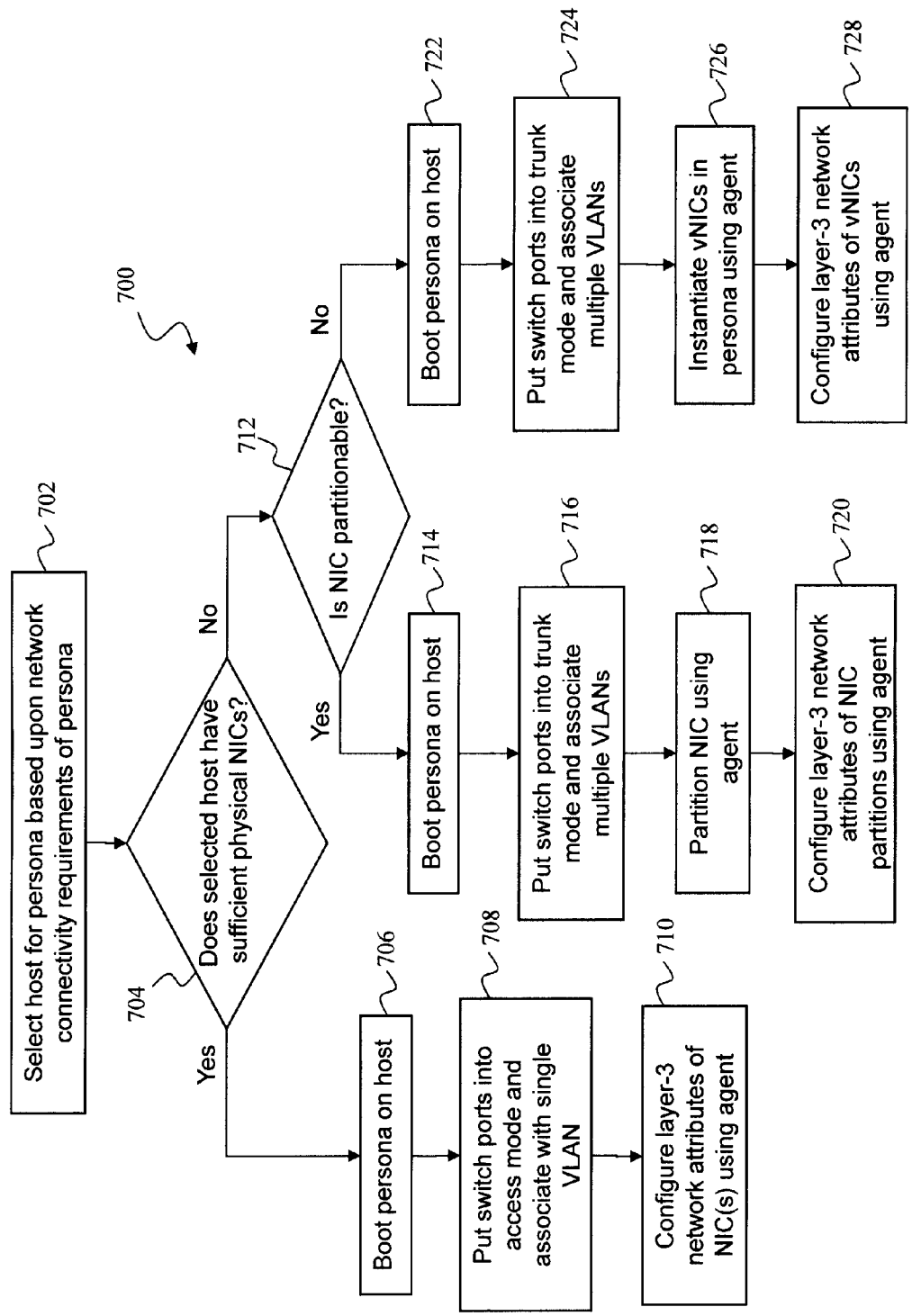
FIG. 7 is a high-level flowchart illustrating an exemplary embodiment of a method of configuring network connections on hosts in the managed system of FIG. 2.

FIG. 7 is a high-level flowchart illustrating an exemplary embodiment of a method 700 for configuring network connections on hosts in the managed system 200. Specifically, the controller 202 may utilize the method 700 to automatically configure the network connections of a host on which a persona will be booted. The method 700 begins at block 702 where the controller 202 selects a host on which to boot a persona based upon the network connectivity requirements of the persona. In one embodiment, the host may be selected based upon the method 300 illustrated in FIG. 3. The method 700 proceeds to decision block 704, where the controller determines whether the selected host has a sufficient number of physical NICs to fulfill the network connectivity requirements of the persona. Specifically, it is determined whether a single physical NIC in the host may be associated with a single VLAN. If so, the method proceeds to block 706 where the persona is booted on the selected host. In an embodiment, a persona agent utilized by the controller to perform network configuration is started in the persona's operating system as it is booted. Next, in block 708, the controller 202 places the switch ports coupled to the host's NICs into access mode and associates a single VLAN with each port based upon the port's channel assignment. The method 700 then moves to block 710 where the persona agent running in the operating system configures the layer 3 networking attributes (e.g. IP address) of the host's physical NIC(s) using information from the controller 202. In this manner, applications in the persona may access desired VLANs using the physical NICs on the host.

Referring back to decision block 704, if the controller 202 determines that the selected host does not have enough physical NICs to fulfill the network connectivity requirements of the persona, the method 700 proceeds to decision block 712. There, the controller determines whether the host includes a partitionable physical NIC. If so, the method 700 continues to block 714 where the persona is booted on the selected host. Then, in block 716, the controller 202 places the switch port coupled to the host's NIC into trunk mode as it will be used to access more than one VLAN. Next, in block 718, a persona agent running in the operating system on the host partitions the hosts NIC into a number of interface partitions equal to the number of VLANs the persona requires access to. Each interface partition is then mapped to a specific VLAN based upon the channel assignment of the associated switch ports. Finally, the persona agent configures the layer 3 networking attributes (e.g. IP address) of the interface partitions of the host's physical NIC using information from the controller 202. In this manner, applications in the persona may access desired VLANs using the interface partitions of the physical NIC on the host.

Referring back to decision block 712, if the controller 202 determines that the selected host does not include a partitionable physical NIC, the method 700 proceeds to block 722. There, the persona is booted on the selected host. Then, in block 724, the controller 202 places the switch ports coupled to the host's NICs into trunk mode as they will be used to access more than one VLAN. Next, in block 726, a persona agent instantiates a number of vNICs in the operating system of the persona that matches the number of VLANs to which the persona requires access. As an aspect of this, the controller 202 instructs the agent to map each of the vNICs to a physical NIC in the host based upon the channel assignment of physical NICs. Finally, the persona agent configures the layer 3 networking attributes (e.g. IP address) of the vNICs using information from the controller 202. In this manner, applications in the persona may access desired VLANs using the vNICs in the selected host's operating system.

In the examples described in association with FIG. 4-6, the controller 202 booted personas 252 and 254 directly on the hardware of the hosts 206, 208, and 210 (i.e. in a bare metal configuration). However, in other embodiments, the controller 202 may be operable to boot a persona in a virtual machine on a host in the managed system 200 and automatically configure the persona's required network connections within the virtualized environment. That is, when controller 202 determines which host in managed system 200 to boot a persona on, as described in association with FIGS. 2 and 3, it may choose from virtual machines as well as bare metal hosts. In general, the network configuration steps described in association with FIG. 4-7 may be similar to those required to boot a persona on a virtual machine except that additional steps may be required. U.S. patent application Ser. No. 13/096,460 filed on Apr. 28, 2011 describes methods and systems for booting a persona in a virtual machine and automatically configuring the persona's required network connections and is hereby incorporated by reference in its entirety.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for configuring a data network, comprising:
   receiving, at a controller coupled to a data network, a request to boot an operating system image on one of a plurality of hosts in the data network;
   determining, by the controller, a first number of virtual networks in the data network to which the operating system image requires access;
   automatically selecting, by the controller, a host out of the plurality of hosts on which to boot the operating system image, wherein the selecting is based upon network connectivity requirements of the operating system image, and wherein the host includes at least one network interface;
   determining, by the controller, that the host includes a fewer number of network interfaces than the first number of virtual networks;
   booting, by the controller, the operating system image on the host;
   partitioning, by an agent executing on the operating system image, the at least one network interface on the host into a plurality of interface partitions that are at least equal in number to the first number of virtual networks; and
   configuring, by the agent, layer 3 networking attributes of the plurality of interface partitions such that each of the plurality of interface partitions is communicatively coupled to a different one of the first number of virtual networks.

2. The method of claim 1, further comprising:
   determining an anticipated network traffic requirement for each of the virtual networks; and
   dividing a total bandwidth of the at least one network interface between the plurality of interface partitions based on the anticipated network traffic requirements of the virtual networks.

3. The method of claim 1, further comprising:
   determining, by the controller, that partitioning the at least one network interface will result in faster network performance than instantiating a plurality of virtual network interfaces and, in response, partitioning the at least one network interface by the agent.

4. The method of claim 1, wherein the host is associated with at least one switch, and wherein the method further comprises:
   configuring, by the controller, the at least one switch based on the network connectivity requirement of the operating system image.

5. The method of claim 4, further comprising:
   placing, by the controller, a switch port on the at least one switch that is coupled to the at least one network interface into a trunk mode prior to partitioning the at least one network interface by the agent.

6. The method of claim 1, further comprising:
   mapping a first interface partition of the plurality of interface partitions to a first virtual network; and
   mapping a second interface partition of the plurality of interface partitions to a second virtual network.

7. The method of claim 1, further comprising:
   determining, by the controller, that a first host of the plurality of hosts includes a partitionable network interface that includes a total throughput speed;
   determining, by the controller, that a second host of the plurality of hosts includes a number of non-partitionable network interfaces that is less than the first number of virtual networks, wherein the number of non-partitionable network interfaces include a combined throughput speed; and determining, by the controller, that the total throughput speed of the partitionable network interface on the first host is greater than the combined throughput speed of the number of partitionable network interfaces on the second host and, in response, automatically selecting the first host out of the plurality of hosts on which to boot the operating system image.

8. A method of configuring a data network, comprising:

receiving, at a controller coupled to a data network, a request to boot an operating system image on one of a plurality of hosts in the data network;

determining, by the controller, a first number of virtual networks in the data network to which the operating system image requires access;

automatically selecting, by the controller, a host out of the plurality of hosts on which to boot the operating system image, wherein the selecting is based upon network connectivity requirements of the operating system image, and wherein the host includes at least one network interface;

determining, by the controller, that the host includes a fewer number of network interfaces than the first number of virtual networks; and determining, by the controller, whether the at least one network interface on the host is partitionable;

wherein in response to determining that the at least one network interface on the host is partitionable, the controller boots the operating system image on the host, and an agent executing on that operating system image partitions the at least one network interface on the host into a plurality of interface partitions that are at least equal in number to the first number of virtual networks, and that agent configures layer 3 networking attributes of the plurality of interface partitions such that each of the plurality of interface partitions is communicatively coupled to a different one of the first number of virtual networks; and wherein in response to determining that the at least one network interface on the host is not partitionable, the controller boots the operating system image on the host, and an agent executing on that operating system image instantiates a number of virtual network interfaces equal to the first number of virtual networks, and that agent configures the layer 3 networking attributes of the number of virtual network interfaces such that each of the number of virtual network interfaces is communicatively coupled to a different one of the first number of virtual networks.

9. The method of claim 8, wherein in response to determining that the at least one network interface on the host is partitionable, the method further comprises:

determining an anticipated network traffic requirement for each of the virtual networks; and dividing a total bandwidth of the at least one network interface between the plurality of interface partitions based on the anticipated network traffic requirements of the virtual networks.

10. The method of claim 8, further comprising:

determining, by the controller, that partitioning the at least one network interface will result in faster network performance than instantiating the plurality of virtual network interfaces and, in response, partitioning the at least one network interface by the agent.

11. The method of claim 8, wherein the host is associated with at least one switch, and wherein the method further comprises:

configuring, by the controller, the at least one switch based on the network connectivity requirement of the operating system image.

12. The method of claim 11, further comprising:

placing, by the controller, a switch port on the at least one switch that is coupled to the at least one network interface into a trunk mode prior to either partitioning the at least one network interface by the agent or instantiating the number of virtual network interfaces by the agent.

13. The method of claim 8, wherein in response to determining that the at least one network interface on the host is partitionable, the method further comprises:

mapping a first interface partition of the plurality of interface partitions to a first virtual network; and mapping a second interface partition of the plurality of interface partitions to a second virtual network.

14. The method of claim 8, wherein in response to determining that the at least one network interface on the host is paritionable, the method further comprises:

determining, by the controller, that a first host of the plurality of hosts includes a partitionable network interface that includes a total throughput speed;

determining, by the controller, that a second host of the plurality of hosts includes a number of non-partitionable network interfaces that is less than the first number of virtual networks, wherein the number of non-partitionable network interfaces include a combined throughput speed; and determining, by the controller, that the total throughput speed of the partitionable network interface on the first host is greater than the combined throughput speed of the number of non-partitionable network interfaces on the second host and, in response, automatically selecting the first host out of the plurality of hosts on which to boot the operating system image.

15. A data network configuration system, comprising:

a controller that is configured to couple to a data network including a plurality of hosts, wherein the controller is further configured to:

receive a request to boot an operating system image on one of the plurality of hosts in the data network;

determine a first number of virtual networks in the data network to which the operating system image requires access;

automatically select a host out of the plurality of hosts on which to boot the operating system image, wherein the selecting is based upon network connectivity requirements of the operating system image, and wherein the host includes at least one network interface;

determine that the host includes a fewer number of network interfaces than the first number of virtual networks; and boot the operating system image on the host; and an agent module that executes on the host in the operating system image and that is configured to:

partition the at least one network interface on the host into a plurality of interface partitions that are at least equal in number to the first number of virtual networks; and configure layer 3 networking attributes of the plurality of interface partitions such that each of the plurality of interface partitions is communicatively coupled to a different one of the first number of virtual networks.

16. The data network management system of claim 15, wherein at least one of the controller and agent module are further configured to:

determine an anticipated network traffic requirement for each of the virtual networks; and divide a total bandwidth of the at least one network interface between the plurality of interface partitions based on the anticipated network traffic requirements of the virtual networks.

17. The data network management system of claim 15, wherein the controller is further configured to:

determine that partitioning the at least one network interface will result in faster network performance than instantiating a plurality of virtual network interfaces, wherein the at least one network interface is partitioned by the agent module in response.

18. The data network management system of claim 15, wherein the host is associated with at least one switch, and wherein the controller is further configured to:

configure the at least one switch based on the network connectivity requirement of the operating system image.

19. The data network management system of claim 18, wherein the controller is further configured to:

place a switch port on the at least one switch that is coupled to the at least one network interface into a trunk mode prior to the at least one network interface being partitioned by the agent module.

20. The data network management system of claim 15, wherein the controller is further configured to:

determine that a first host of the plurality of hosts includes a partitionable network interface that includes a total throughput speed;

determine that a second host of the plurality of hosts includes a number of non-partitionable network interfaces that is less than the first number of virtual networks, wherein the number of non-partitionable network interfaces include a combined throughput speed; and determine that the total throughput speed of the partitionable network interface on the first host is greater than the combined throughput speed of the number of partitionable network interfaces on the second host and, in response, automatically select the first host out of the plurality of hosts on which to boot the operating system image.

* * * * *